(12) United States Patent
Reichert et al.

(10) Patent No.: US 9,933,072 B2
(45) Date of Patent: Apr. 3, 2018

(54) WORKING CYLINDER

(71) Applicant: FESTO AG & Co. KG, Esslingen (DE)

(72) Inventors: Klaus Reichert, Steinenbronn (DE); Andreas Schleth, Esslingen (DE)

(73) Assignee: FESTO AG & CO. KG, Esslingen (DE)

( * ) Notice: Subject to any disclaimer, the term of this patent is extended or adjusted under 35 U.S.C. 154(b) by 381 days.

(21) Appl. No.: 14/418,333

(22) PCT Filed: Apr. 5, 2013

(86) PCT No.: PCT/EP2013/001005
§ 371 (c)(1),
(2) Date: Jan. 29, 2015

(87) PCT Pub. No.: WO2014/161559
PCT Pub. Date: Oct. 9, 2014

(65) Prior Publication Data
US 2015/0219216 A1    Aug. 6, 2015

(51) Int. Cl.
 *F15B 15/20* (2006.01)
 *F16J 10/02* (2006.01)
 *F15B 15/14* (2006.01)

(52) U.S. Cl.
CPC ........... *F16J 10/02* (2013.01); *F15B 15/1433* (2013.01)

(58) Field of Classification Search
CPC ... F16J 10/02; F15B 15/1433; F15B 15/1438; F17C 2203/01; F17C 2203/011; F17C 2203/012

USPC ......... 92/196.2, 171.1, 165 R, 161; 220/608, 220/581
See application file for complete search history.

(56) References Cited

U.S. PATENT DOCUMENTS

| 927,162 | A | * | 7/1909 | Perry | ....................... F16J 10/02 277/553 |
| 3,395,620 | A | | 8/1968 | Schmoeger | |
| 4,487,022 | A | * | 12/1984 | Kytta | .................... B60T 13/567 60/547.1 |

FOREIGN PATENT DOCUMENTS

| DE | 4405914 | | 8/1995 | |
| JP | S6389406 | | 6/1988 | |
| JP | H11230115 | * | 8/1999 | .............. F15B 15/14 |

OTHER PUBLICATIONS

JPH11230115 Espacenet Machine Translation.*

* cited by examiner

*Primary Examiner* — Thomas E Lazo
*Assistant Examiner* — Dustin T Nguyen
(74) *Attorney, Agent, or Firm* — Hoffmann & Baron, LLP

(57) ABSTRACT

In a working cylinder, with a cylinder casing, in the cylinder interior of which is mounted a driving piston capable of linear movement under fluidic pressurization, wherein the cylinder casing is mounted between two cylinder covers closing the cylinder interior, wherein the cylinder covers each have a central section and an outer frame section, with at least four mounting areas and encompassing the central section, wherein there is formed between the frame section and the central section an annular space, in which are provided reinforcing struts aligned radially and each extending towards an assigned mounting area, outer surfaces of each reinforcing strut diverge away from the assigned mounting area towards the central section.

11 Claims, 3 Drawing Sheets

WORKING CYLINDER

This application claims priority based on an International Application filed under the Patent Cooperation Treaty, PCT/EP2013/001006, filed Apr. 5, 2013.

BACKGROUND OF THE INVENTION

The invention relates to a working cylinder with a cylinder casing, in the cylinder interior of which is mounted a driving piston, capable of linear movement under fluidic pressurisation, wherein the cylinder casing is mounted between two cylinder covers closing the cylinder interior, wherein the cylinder covers each have a central section and an outer frame section, with at least four mounting areas and encompassing the central section, wherein there is formed between the frame section and the central section an annular space, in which are provided reinforcing struts aligned radially and each extending towards an assigned mounting area.

Working cylinders are used as elements performing work, for example in industrial pneumatics or hydraulics. Working cylinders may also be in the form of standard cylinder, in which certain contours are fixed. Such standard cylinders have a cylinder casing which is clamped by clamping means between two cylinder covers. The clamping means generally comprise several tie rods, each extending from one cylinder cover to the other, outside the cylinder casing, and fixed to the cylinder covers by fixing means in such a way that the cylinder casing is clamped between the two cylinder covers.

Typical embodiments of such cylinder covers, as used in particular for large cylinders, include square contours, offset depressions/recesses for tie-rod nuts, and diagonal ribbing. The ribbing is often designed with sharp edges and/or small radii which, due to the higher notch stresses occurring there, are responsible for reduced component loadability. The continuous contoured walls make only a limited contribution to mechanical component stability, and/or create load-critical areas around the screw connection.

SUMMARY OF THE INVENTION

The problem of the invention is to create a working cylinder of the type described above which, in comparison with conventional working cylinders, has greater strength while requiring the same or less use of material in its manufacture.

This problem is solved by a working cylinder with the features of the independent claim 1. Developments of the invention are set out in the dependent claims.

The working cylinder according to the invention is distinguished by the fact that outer surfaces of each reinforcing strut diverge away from the assigned mounting area towards the central section.

The diverging outer surfaces provide for an optimal flow of force from the respective mounting areas around the centre of the working cylinder towards the opposite mounting area. Expediently the reinforcing struts form so-called cantilever beams, running diagonally between the central section and the outer frame section towards the assigned mounting area. On account of this course of the reinforcing struts or cantilever beams, the component loading on the mounting areas is fed into the structure in such a way that the flow of force does not overload the component even with minimised wall thickness. The cylinder covers may therefore be of lightweight design.

In a development of the invention, the facing outer surfaces of adjacent reinforcing struts merge into one another over a concave curved transitional surface in the area of the central section. Expediently, the transitional surface is curved with a constant tangent. Because of the concave curved transitional surface, tight radii which would be responsible for high notch stresses and therefore low component stability are avoided.

In an especially preferred manner, each of the reinforcing struts has a recess. This allows for a saving of material and consequently a reduction in weight for the cylinder covers.

In an especially preferred manner, a frame-like reinforcing structure comprised of two strut legs is formed by the recess. Such a reinforcing structure might also be described as a two-rib cantilever beam. A reinforcing structure of this kind, with its diverging outer surfaces, is distinguished by a high degree of optimisation of the flow of force and of use of material.

It is especially expedient if the strut legs of each reinforcing strut diverge from the mounting area towards the central section.

In a development of the invention, each of the outer surfaces of the reinforcing struts merges into the outer frame section via a concave curved connection surface. Expediently, the connection surface is curved with a constant tangent. Because of this, tight radii and therefore high notch stresses, with their negative effect on component stability, are also avoided in the transition between the reinforcing struts and the outer frame section.

In a development of the invention, the mounting areas extend in an eye-like manner radially outwards from the rest of the outer frame section.

In an especially preferred manner, the mounting areas have at least one fixing hole for the seating of fixing means. The fixing means may for example have for each mounting area a tie rod and a securing nut or fixing screw. By means of the tie rods running between the two cylinder covers, the latter may be clamped to the cylinder casing. Expediently the radially outwards extending mounting areas are similarly optimised for notch stress, in particular tight radii are avoided between the outer frame section and the adjacent mounting areas.

In an especially preferred manner, the outer frame section between two adjacent mounting areas is matched to the outer contour of the cylinder casing. In particular, the areas of the outer frame section between two adjacent mounting areas adopt an arc-like, in particular a circular-arc-shaped pattern.

In an especially preferred manner, the mounting areas together define a mounting surface for attachments. The flow of force from external forces transmitted via the attachments does not therefore act on the outer frame section but instead directly on the mounting areas, which are especially rigid, in particular due to the tie rods provided there. This makes it possible to reduce the wall thickness of the outer frame section. Moreover there is no need for machining of the contour end face of the outer frame section, as would be necessary with the fixing of an attachments at that point.

In a development of the invention, areas of weakened material are provided between respectively adjacent reinforcing struts, thereby allowing a further saving of material.

In a development of the invention, the cylinder cover has a base section in which the inner face closing the cylinder space is made with no recesses or areas of weakened material.

Expediently the reinforcing struts extend upwards from an outer surface of the base section, in particular being moulded integrally with the outer surface of the base section. The cylinder cover may involve a casting, in which the reinforcing struts are preferably formed at the same time in the casting process.

BRIEF DESCRIPTION OF THE DRAWINGS

A preferred embodiment of the invention is shown in the drawing and explained in detail below. The drawing shows in.

DETAILED DESCRIPTION OF THE PREFERRED EMBODIMENTS

FIGS. 1 to 6 show a preferred embodiment of the working cylinder 11 according to the invention. The working cylinder 11 is described below by way of example with the aid of a fluidic, in particular pneumatic, working cylinder.

The working cylinder 11 in the example involves a large cylinder with a cylinder casing 12 of relatively large diameter.

Figure 3:
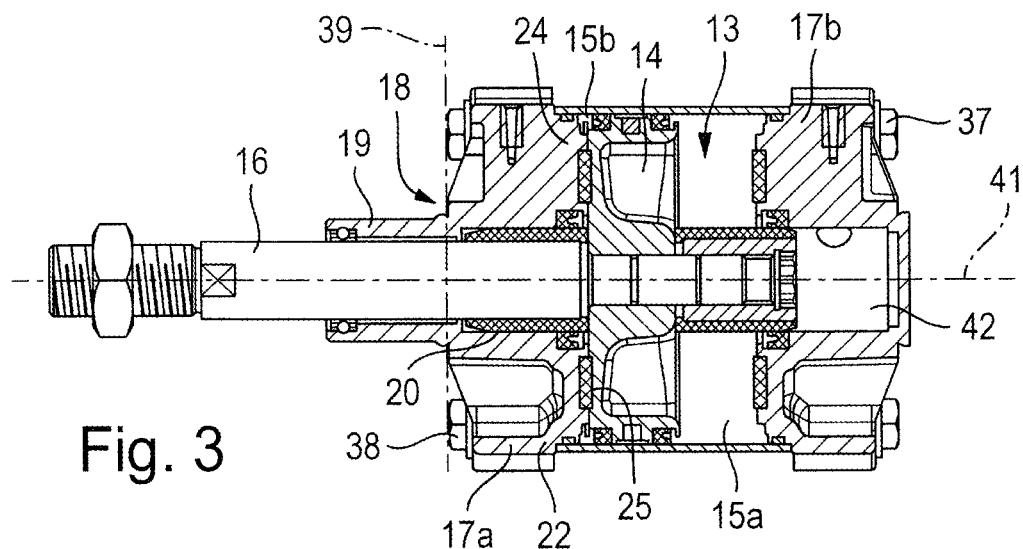
FIG. 3 a longitudinal section through the working cylinder along the line III-III of FIG. 2

As shown in particular in FIG. 3, a driving piston 14 is mounted with linear movement capability in the cylinder interior 13 of the cylinder casing 12. Movement of the driving piston 14 is effected by fluidic pressurisation, in particular by means of pressurisation with compressed air. The driving piston 14 divides the cylinder interior into two working chambers 15a, 15b into which compressed air may be introduced as required, in order to move the driving piston in one or the other direction. Control of the two working chambers 15a, 15b is effected via a valve unit (not shown) which may comprise for example a 3/2-way valve. With this valve functionality it is possible to vent the one working space 15b while the other working space 15a is pressurised with compressed air, and vice-versa.

As shown in particular in FIG. 3, the driving piston 14 is connected to a piston rod 16 which extends out from the cylinder casing 12. The movement of the driving piston may then be tapped at the piston rod 16 as an output movement.

Figure 4:
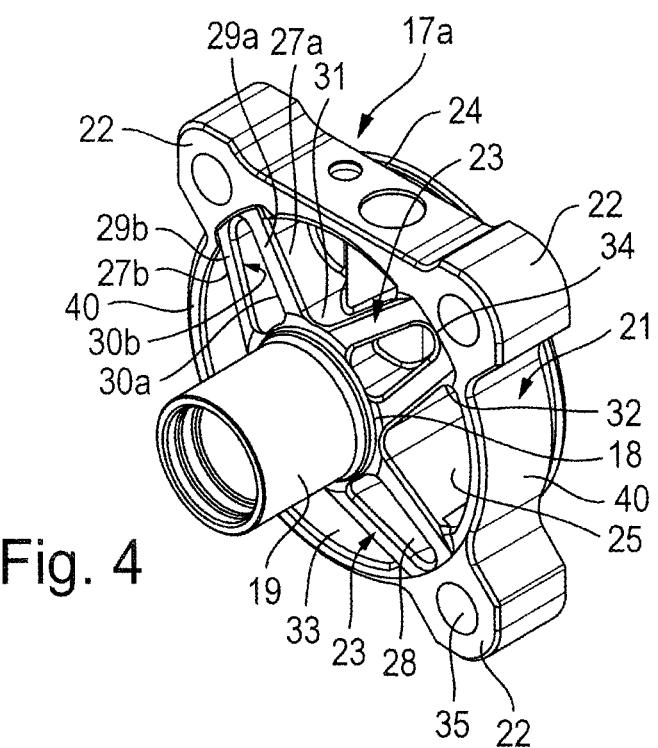
FIG. 4 a perspective view of a first cylinder cover of the working cylinder of FIG. 1
Figure 5:
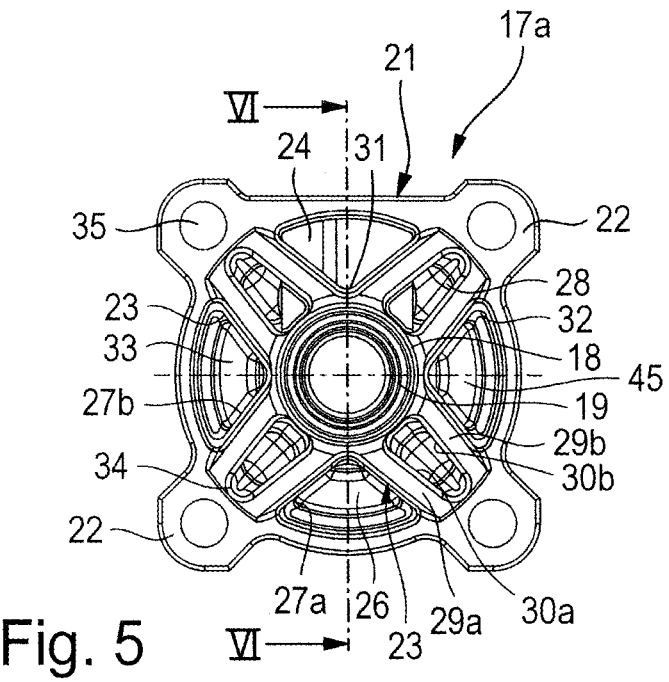
FIG. 5 an end view of the cylinder cover of FIG. 4.
Figure 6:
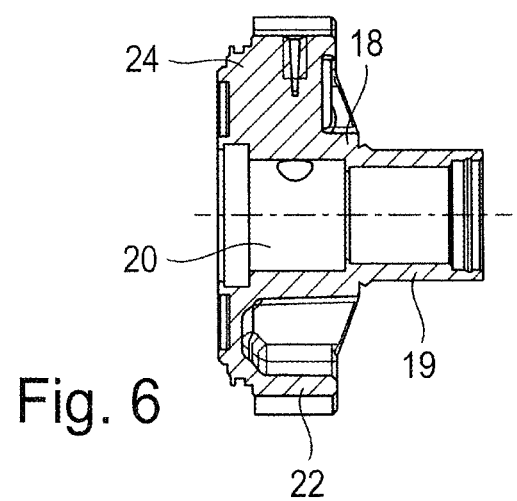
FIG. 6 a longitudinal section through the cylinder cover along the line VI-VI of FIG. 5.

The cylinder casing 12 is held between two cylinder covers 17a, 17b which close the cylinder interior 13 at both ends. The cylinder covers 17a, 17b, of which one is shown in FIGS. 4 to 6, are made of cast material, in particular aluminium. Other methods of production and materials are conceivable. In the following, the first cylinder cover 17a will be described by way of example, since it has a basic design identical to the second cylinder cover 17b.

The first cylinder cover 17a has a central section 18 which is annular and to which is attached, as shown in particular in FIG. 4, a cylindrical sleeve section 19. As shown in particular in FIG. 3, the central section 18 is provided with a through hole 20 for the through passage of the piston rod 16, which also passes through the sleeve section 19 arranged coaxial to the through hole 20. At the leading exit end of the sleeve section 19 is a ring seal for sealing the passage between the piston rod 16 and the sleeve section 19.

The cylinder cover 17a also has an outer frame section 21 which encompasses the central section 18. On the frame section 21 are four mounting areas 22, which will be described in more detail below.

Formed between the central section 18 and the frame section 21 is an annular space 45, in which are mounted reinforcing struts 23, aligned in the radial direction and each extending towards an assigned mounting area 22. Finally the cylinder cover 17a has a circular-disc-shaped base section 24 with an inner face 25 facing towards the cylinder interior 13, and with an outer surface 26 on to which the reinforcing struts 23 are integrally moulded and from which they extend away.

Figure 1:
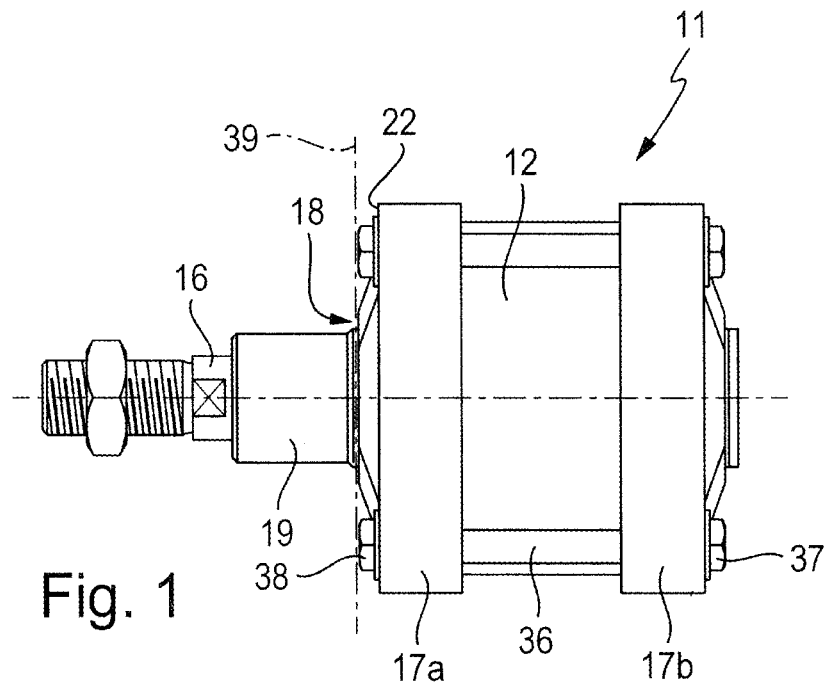
FIG. 1 a side view of a preferred embodiment of the working cylinder according to the invention FIG. 2 an end view of the working cylinder of FIG. 1
Figure 2:
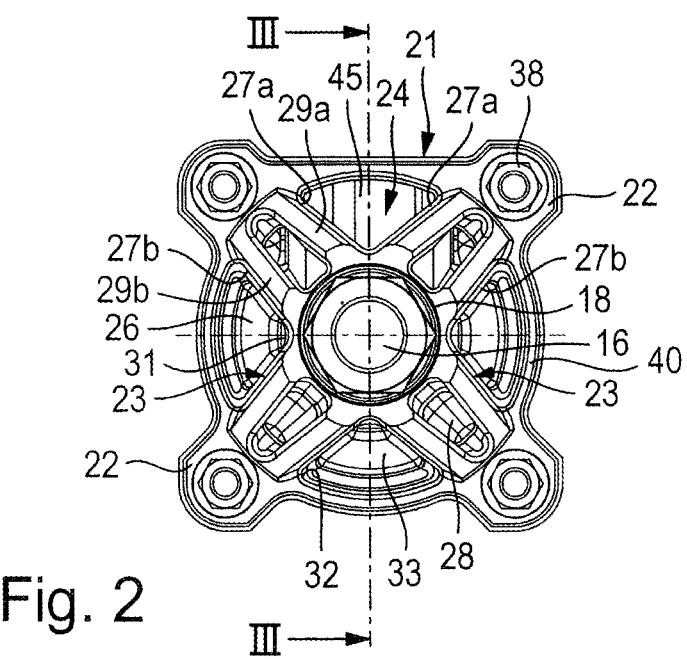

As shown in particular in FIGS. 2 and 5, the mounting areas 22—four in the example—define together a square basic shape of the cylinder cover 17a. From the mounting areas 22, the reinforcing struts 23 extend radially towards the annular central section 18.

A characteristic feature of the reinforcing struts 23 is that their outer surfaces 27a, 27b, starting from the assigned mounting area 22, diverge towards the central section 18.

Each of the reinforcing struts 23 has a recess 28 extending radially between the mounting area 22 and the central section 18. Expediently the recess extends in the radial direction from the mounting area 22 up to the peripheral surface of the cylindrical central section 18. The depth of the recess 28 reaches expediently as far as the outer surface 26 of the base section 24. The recess 28 in each reinforcing strut 23 produces a characteristic frame-like structure of two web-like strut legs 29a, 2b.

As shown in particular by FIG. 2, the strut legs 29a, 29b of each reinforcing strut 23 diverge, starting from the assigned mounting area 22, in the direction of the central section 18. The strut legs 29a, 29b therefore each have an outer surface which coincides with the outer surface of the reinforcing strut 23, and an inner face 30a, 30b. Inner and outer faces of each strut leg 29a, 29b run roughly parallel to one another in the radial direction. The inner faces 30a, 30b form side faces of the recess 28.

An important aspect is that the facing outer faces 27a, 27b of adjacent reinforcing struts 23 merge into one another in the area of the central section 18 via a concave curved transitional surface 31. The transitional surface 31 is expediently curved with a constant tangent. As a result of this, the reinforcing struts 23 are in direct contact with one another in the area of the central section 18. Small radii and consequently high notch stresses in these areas are avoided. The outer surfaces 27a, 27b of the reinforcing struts 23 are moreover connected to the outer frame section 21 via a concave curved connection surface 32. This leads to an avoidance of notch stresses, since here too small radii are not necessary.

As shown in particular in FIG. 2, areas of weakened material 33 are provided between respectively adjacent reinforcing struts 23. The areas of weakened material 33 take the form of a circular sector. Also the facing inner faces 30a, 30b of each reinforcing strut 23 merge into one another via concave curved transitional surfaces 34.

As mentioned earlier, four mounting areas are provided for the cylinder cover 17a, but this could also be six or more. The mounting areas 22 extend radially outwards from the rest of the outer frame section in the manner of an eye. The mounting areas 22 have at least one fixing hole 35 to accommodate fixing means. In the example, the fixing means comprise for each mounting area 22 a tie rod 36, which may be provided at one end with a screw head 37. The tie rod is then inserted through the fixing hole 35 of the second cylinder cover 17b, then extends outside the outer periphery of the cylinder casing 12 towards the first cylinder cover 17a, where it is guided through the fixing hole 35 provided there. At the end of the tie rod 36 is a threaded section, on to which a securing nut 38 may be screwed.

As shown in particular in FIG. 2, at least three of the four segments 40 of the outer frame section 21 extending between adjacent mounting areas 22 are matched to the shape of the cylinder casing 12. The segments 40 are therefore designed with a circular-arc shape. Only the upper segment 40 shown in FIG. 2 forms a linear section running between the mounting areas 22, and serves as interface for connection of the fluid supply of the working cylinder 11. For cylinders of large diameter, the segments could also be circular, each with a flattened area.

The mounting areas 22 together form a mounting surface 39 for attachments. The mounting surface 39 is aligned perpendicular to a longitudinal axis 41 of the working cylinder 11. Expediently the mounting surface 39 is formed by the end face of the securing nut 38. This mounting surface 39 has the advantage that no machining of the end contour of the outer frame section 21 is necessary. In addition, any external introduction of force is always to be expected at the stiffened mounting areas 22, so that there is virtually no direct loading of the outer frame section 21, meaning that the outer frame section 21 may be made with reduced wall thickness.

Altogether, through the reinforcing struts 23 divided into two, with recesses 28 and areas of weakened material 33, and the characteristic course of the reinforcing struts 23, measures are taken which produce a cylinder cover 17a of lightweight construction which, as compared with conventional cylinder covers, stands out for its lower weight and optimised strength.

The second cylinder cover 17b differs from the first cylinder cover 17a only in that the sleeve section 19 is omitted and instead of a central section 18 with through hole 20, a central section with blind hole 42 is formed.

The invention claimed is:

1. A working cylinder with a cylinder casing, in the cylinder interior of which is mounted a driving piston, capable of linear movement under fluidic pressurisation, wherein the cylinder casing is mounted between two cylinder covers closing the cylinder interior, wherein the cylinder covers each have a central section and an outer frame section, with at least four mounting areas and encompassing the central section, wherein there is formed between the outer frame section and the central section an annular space, in which are provided reinforcing struts aligned radially and each strut extending from the central section and terminating at a respective assigned mounting area, wherein each reinforcing strut has two outer surfaces that diverge away from each other in a direction from the assigned mounting area towards the central section.

2. A working cylinder according to claim 1, wherein each of the reinforcing struts has a recess.

3. A working cylinder according to claim 2, wherein a frame reinforcing structure comprised of two strut legs is formed by the recess.

4. A working cylinder according to claim 3, wherein the strut legs of each reinforcing strut diverge from the mounting area towards the central section.

5. A working cylinder according to claim 1, wherein each of the outer surfaces of the reinforcing struts merges into the outer frame section via a concave curved connection surface.

6. A working cylinder according to claim 1, wherein the mounting areas extend in a web radially outwards from the rest of the outer frame section.

7. A working cylinder according to claim 1, wherein the mounting areas have at least one fixing hole for the seating of fixing means, wherein the fixing means have for each mounting area a tie rod and a securing nut or fixing screw.

8. A working cylinder according to claim 1, wherein the outer frame section between two adjacent mounting areas is matched to the outer contour of the cylinder casing and assumes a circular-arc-shaped pattern.

9. A working cylinder according to claim 1, wherein the mounting areas together define a mounting surface for attachments.

10. A working cylinder according to claim 1, wherein recessed areas are provided between respectively adjacent reinforcing struts.

11. A working cylinder with a cylinder casing, in the cylinder interior of which is mounted a driving piston, capable of linear movement under fluidic pressurisation, wherein the cylinder casing is mounted between two cylinder covers closing the cylinder interior, wherein the cylinder covers each have a central section and an outer frame section, with at least four mounting areas and encompassing the central section, wherein there is formed between the outer frame section and the central section an annular space, in which are provided reinforcing struts aligned radially and each extending towards an assigned mounting area, wherein each reinforcing strut has two outer surfaces that diverge away from each other in a direction from the assigned mounting area towards the central section,
  wherein the facing outer surfaces of adjacent reinforcing struts merge into one another over a concave curved transitional surface in the area of the central section.

* * * * *